H. FOERSTERLING, H. PHILIPP AND R. N. SARGENT.
PROCESS OF MANUFACTURING CYANOGEN COMPOUNDS.
APPLICATION FILED OCT. 29, 1913. RENEWED JAN. 14, 1918.
1,332,439.
Patented Mar. 2, 1920.
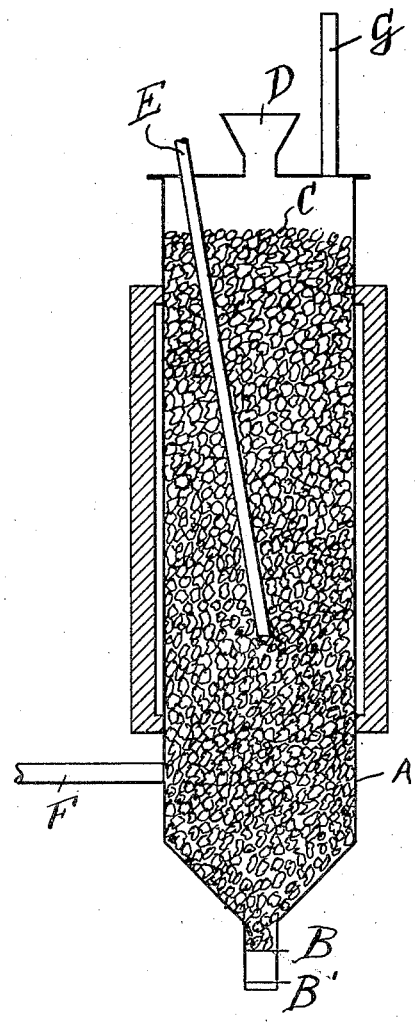

UNITED STATES PATENT OFFICE.

HANS FOERSTERLING, HERBERT PHILIPP, AND RALPH NELSON SARGENT, OF PERTH AMBOY, NEW JERSEY, ASSIGNORS TO THE ROESSLER & HASSLACHER CHEMICAL CO., OF NEW YORK, N. Y., A CORPORATION OF NEW YORK.

PROCESS OF MANUFACTURING CYANOGEN COMPOUNDS.

1,332,439.      Specification of Letters Patent.      Patented Mar. 2, 1920.

Application filed October 29, 1913, Serial No. 798,042. Renewed January 14, 1918. Serial No. 211,899.

*To all whom it may concern:*

Be it known that we, HANS FOERSTERLING, a citizen of the Empire of Germany, and HERBERT PHILIPP and RALPH NELSON SARGENT, both citizens of the United States, all residing in Perth Amboy, in the county of Middlesex and State of New Jersey, have invented certain new and useful Improvements in Processes of Manufacturing Cyanogen Compounds, of which the following is a specification.

Our invention relates to the manufacture of cyanogen compounds and it particularly refers to their manufacture by syntheses from the respective constituent elements.

In an application for Letters Patent Serial No. 739,352 by one of us, which has become Patent No. 1,283,716, issued Nov. 5, 1918, there is disclosed that the manufacture of metals or metal nitrid simultaneously with the production of by-products in the form of cyanogen compounds may be achieved by decomposing suitable chemical compounds by volatile metals, preferably in a vaporous state, in the presence of carbonaceous and nitrogenous matter, the latter entering into combination with one or more of the constituents of the reaction.

In the aforesaid application there is also shown that the reaction liberates a large number of heat units so that the formation of the nitrogenous compounds continues without further expenditure of fuel when once started.

Prior to the researches disclosed in the application referred to above we have discovered that the problem of manufacturing cyanogen compounds from their single constituents on a large scale involves carrying out a heat liberating process and that there are certain conditions which govern this process in regard to its liberating heat so as to make it a convenient and effective way of manufacturing said compounds.

Our process represents substantially a process for the fixation of nitrogen, by passing said gas under certain conditions, the details of which will be further pointed out below, into an incandescent mixture of carbonaceous material and an alkali or alkaline earth metal. One of the essential points to be observed in order to have the process go on as a heat-liberating or exothermic process is the temperature which is maintained during the process.

We have found that if carbon is heated to a temperature approximate to the boiling point of the metal the cyanogen compound of which is desired to be made, and for instance an alkali metal in a molten condition, for instance sodium metal, is introduced through a pipe into same, in the presence of nitrogen gas, the sodium metal readily volatilizes owing to the high temperature and the three elements combine to form sodium cyanid and liberate the heat of reaction in a way which renders it available for the purposes of the process. Appreciable combination is already evident at 700° C. and the absorption of nitrogen increases with the rise of temperature, the absorption above 840° C. being very rapid, and extremely rapid between 1000° and 1100° C. The reaction between these elements is then under those conditions, as already pointed out above, of exorthermic nature and after the reaction has started in it is self-sustained by the reaction heat and no external heat need further be applied. The point, when the supply of external heat may be dispensed with, is of course influenced by various matters, as for instance by the speed with which the materials are fed and consequently by the quantities of raw materials applied during a given time, by the surface of the carbon for radiating heat, etc., so that this point can hardly be fixed once and for all to hold good for any and all conditions. We may say, however, that we did not find it safe to shut off the supply of external heat until the boiling point of the metal applied is reached approximately, said boiling point being of course subject to the respective changes in case pressure or partial vacuum is resorted to in the operation of the process.

Carbon is preferably applied in its form of charcoal or other carbonaceous matter, segregating carbon under the conditions prevailing in the process; charcoal, if applied for instance,—is provided in sufficient excess to absorb most of the cyanid of sodium formed and only a relatively small amount of same drains out in the molten form.

It is but natural that the charcoal, after having absorbed so much sodium cyanid as to constitute more than 60% of the total weight of the lumps generated thereby, becomes less reactive and eventually by further absorption becomes non-reactive. We thus obtain a mass which tests above 60% NaCN, from which it can be leached out and made into a commercial product by any of the well known means.

The reaction starts at the bottom of the charcoal mass when the initial heat is sufficient there and as the charcoal there gradually becomes saturated the zone of reaction, if not checked, travels upward through the mass without the addition of external heat, inasmuch as the heat liberated by the process renders same self-sustaining by keeping the charcoal incandescent.

The accompanying drawing, which represents a vertical sectional view of a suitable reaction-vessel, surrounded by the usual furnace walls, illustrates one way by which our process may be practised.

The following example will serve for the elucidation of our process and method of operating the same: A suitable iron vessel A of strong construction to satisfactorily stand the wear and tear of the process and not be affected by the products of the reaction, is provided at the bottom with gate-valves B and B' to serve as outlet for the cyanid generated in the process. The charcoal C is filled into the vessel through a suitable opening D and rests on gatevalve B. The vessel is then heated externally until the boiling point of sodium is approximately reached, when sodium metal, preferably in molten form, though it may just as well be admitted in the form of vapor, is introduced by means of a pipe E, while nitrogen gas enters through pipe F. As soon as the reaction is started, as indicated by a reasonable rise in temperature, passing 800° C., the external heat may be shut off and the temperature rises, all other circumstances remaining unchanged, up to about 960° C. Gases unreacted upon escape through pipe G.

It is obvious in view of the temperature prevailing in A that the sodium in whatever physical condition it is admitted into A is readily transformed into a vapor penetrating the charcoal simultaneously with the nitrogen gas; as it is essential for the success of the process that sodium be in vaporous form to enter into the reaction, therefore it is easily seen that sodium vapor proper can just as well be passed directly into the mass or that it, and the nitrogen likewise, may be admitted from below. As soon as the reaction starts the temperature of the mass rises according to the quantities used, thus the reaction zone is trying to gradually work its way up through the mass of charcoal, but in the operation of the process suitable provisions should be made to arrest the zone of reaction in its original location. The column of charcoal can be agitated by any suitable means as thereby the absorption of the sodium cyanid by the charcoal is more even and complete. In one case we introduced 784 kilos of sodium and a slight excess of an equivalent of nitrogen gas; we obtained 96.7 kilos NaCN which had drained from the charcoal, while the balance of about 1570 kilos was retained in the charcoal mass, the latter showing an average test of about 64% NaCN.

A slight excess of nitrogen was merely supplied to keep any air from entering at the top of the vessel and is unnecessary with a closed top, in which case gases unreacted upon may leave the apparatus for instance through the charcoal inlet.

We have found further that the formation of cyanid goes extremely rapidly, which makes the process very economical, and the apparatus for the production of large quantities represents a comparatively small unit. This process can of course be worked either intermittently or continuously, in the latter case provision must be made for drawing off of the mass from the bottom and for introducing fresh charcoal at the top.

It is obvious that the process described above may be carried out in any suitable apparatus which will readily allow the various operations described to be performed.

As our invention demands that the metal, the cyanogen compound of which is desired, enters the reaction in the form of vapor, it is obvious that our invention relates primarily to the production of both alkali and alkaline earth cyanids, as the metals of these groups may be more or less easily vaporized; but the production of cyanids of such other metal, forming cyanids and being susceptible to volatilization, is also claimed as coming within the scope of our invention.

Many changes may also be made in the mode of operating the process as far as its purely chemical side is concerned, which changes in their character will in no way deviate from the spirit of our invention and we therefore shall not restrict ourselves to the mode of carrying out the process as described further than the scope of the appended claims demands.

Furthermore it is of course understood that the heating from "outside" may be effected with any kind of heat derived from any source whatever which in regard to its origin and character naturally must be fundamentally different from the heat furnished by the energy of the reaction forming the main part of the subject matter of this invention.

We claim:

1. The exothermic process of making cyanogen compounds, consisting in combining the elements of the desired cyanogen compound by admitting a metal susceptible to volatilization and nitrogen gas to charcoal in excess and heated from the outside to about the boiling point of said volatile metal, discontinuing the supply of outside heat upon a reasonable increase in temperature indicating start of reaction, generating heat by the reaction between the elements, promoting the combination of such elements, further admitted, by means of the heat of reaction and absorbing the greater part of the generated cyanogen compound by the excess of charcoal present.

2. The exothermic process of making cyanogen compounds, consisting in combining the elements of the desired cyanogen compound by admitting a metal susceptible to volatilization and nitrogen gas to charcoal in excess and heated from the outside to about the boiling point of said volatile metal, discontinuing the supply of outside heat upon a reasonable increase in temperature indicating the start of reaction, generating heat by the reaction between the elements, promoting the combination of such elements, further admitted, by means of the heat of reaction, absorbing the generated cyanogen compound by the excess of charcoal present and producing thereby a mixture of charcoal and cyanogen compound to carry about 60% and more of the latter.

3. The exothermic process of making cyanogen compounds, consisting in combining the elements of the desired cyanogen compound by admitting a metal susceptible to volatilization and nitrogen gas to charcoal in excess and heated from the outside to about the boiling point of said volatile metal, starting the reaction at the bottom of the reaction mass, generating heat by the reaction between the elements, absorbing the generated cyanogen compound in the charcoal and arresting the reaction zone in its original location.

4. The exothermic process of making cyanogen compounds, consisting in combining the elements of the desired cyanogen compound by admitting a metal susceptible to volatilization and nitrogen gas to charcoal in excess and heated from the outside to about the boiling point of said volatile metal, starting the reaction at the bottom of the reaction mass, discontinuing the supply of outside heat upon a reasonable increase in temperature indicating the start of reaction, generating heat by the reaction between the elements, promoting by means of the heat of reaction the combination of such elements further admitted, absorbing the greater part of the generated cyanogen compound in the charcoal to produce a mixture of both containing 60% and more of the cyanogen compound and arresting the reaction zone in its original location.

5. The exothermic process of making an alkali cyanid, consisting in combining the elements of the desired alkali cyanid by admitting the respective alkali metal and nitrogen gas to charcoal in excess and heated from the outside to about the boiling point of said alkali metal, discontinuing the supply of outside heat upon a reasonable increase in temperature indicating start of reaction, generating heat by the reaction between the elements, promoting the combination of such elements, further admitted, by means of the heat of reaction and absorbing the greater part of the generated cyanid by the excess of charcoal present.

6. The exothermic process of making an alkali cyanid, consisting in combining the elements of the desired alkali cyanid by admitting the respective alkali metal and nitrogen gas to charcoal in excess and heated from the outside to about the boiling point of said alkali metal, discontinuing the supply of outside heat upon a reasonable increase in temperature indicating start of reaction, generating heat by the reaction between the elements, promoting the combination of such elements, further admitted, by means of the heat of reaction, absorbing the generated cyanid by the excess of charcoal present and producing thereby a mixture of charcoal and cyanid to carry about 60% and more of the latter.

7. The exothermic process of making an alkali cyanid, consisting in combining the elements of the desired cyanid by admitting the respective alkali metal and nitrogen gas to charcoal in excess and heated to about the boiling point of said alkali metal, starting the reaction at the bottom of the reaction mass, generating heat by the reaction between the elements, absorbing the generated cyanid in the charcoal and arresting the reaction zone in its original location.

8. The exothermic process of making sodium cyanid consisting in combining sodium, carbon and nitrogen gas, by admitting sodium and nitrogen gas to charcoal in excess and heated from the outside to about the boiling point of sodium, discontinuing the supply of outside heat upon indication of started reaction upon reasonable increase in temperature, generating heat by the reaction between the above elements, promoting the combination of the respective elements, further admitted, by means of the heat of reaction and absorbing the greater part of the generated sodium cyanid by the excess of charcoal present.

9. The exothermic process of making sodium cyanid consisting in combining sodium, carbon and nitrogen gas by admitting sodium and nitrogen gas to charcoal in excess and heated from the outside to about the boiling point of sodium, discontinuing the supply of outside heat upon indication of started reaction upon reasonable increase in temperature, generating heat by the reaction between the above elements, promoting the combination of the respective elements, further admitted, by means of the heat of reaction, absorbing the generated sodium cyanid by the excess of charcoal present and producing thereby a mixture of charcoal and sodium cyanid to carry about 60% and more of the latter.

10. The exothermic process of making sodium cyanid, consisting in combining sodium, carbon and nitrogen gas by admitting a sodium and nitrogen gas to charcoal in excess and heated from the outside to about the boiling point of sodium, starting the reaction at the bottom of the reaction mass, generating heat by the reaction between the above elements, absorbing the generated sodium cyanid in the charcoal and arresting the reaction zone in its original location.

11. The exothermic process of making sodium cyanid, consisting in combining sodium, carbon and nitrogen gas by admitting sodium and nitrogen gas to charcoal in excess and heated from the outside to about the boiling point of sodium, starting the reaction at the bottom of the reaction mass, discontinuing the supply of outside heat upon indication of started reaction upon reasonable increase in temperature, generating heat by the reaction between the elements, promoting by means of the heat of reaction the combination of the respective elements further admitted, absorbing the greater part of the generated sodium cyanid in the charcoal to produce a mixture of both containing 60% and more of the cyanogen compound, and arresting the reaction zone in its original location.

HANS FOERSTERLING.
HERBERT PHILIPP.
RALPH NELSON SARGENT.

Witnesses:
MARIE NETEL,
OTTO K. ZWINGENBERGER.